(No Model.)
F. R. MOSER.
WEIGHING SCALE.
No. 591,657. Patented Oct. 12, 1897.
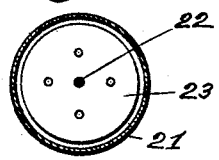
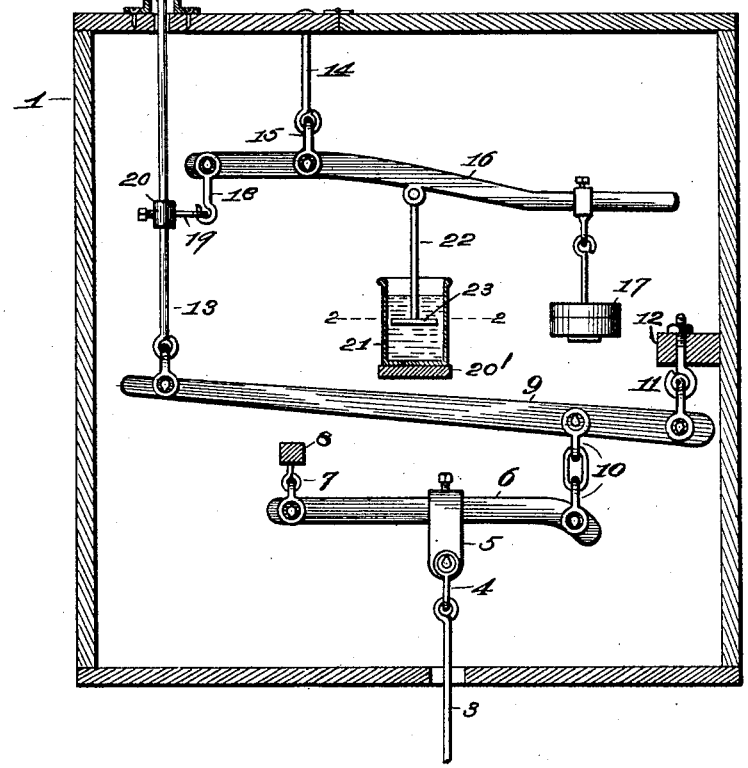
Attest
M. P. Smith
S. G. Wells
Inventor:—
Frank R. Moser:—
By Higdon, Longan & Higdon
Attys:—

UNITED STATES PATENT OFFICE.

FRANK R. MOSER, OF ST. LOUIS, MISSOURI.

WEIGHING-SCALE.

SPECIFICATION forming part of Letters Patent No. 591,657, dated October 12, 1897.

Application filed January 18, 1897. Serial No. 619,582. (No model.)

*To all whom it may concern:*

Be it known that I, FRANK R. MOSER, of the city of St. Louis, State of Missouri, have invented certain new and useful Improvements in Weighing-Scales, of which the following is a full, clear, and exact description, reference being had to the accompanying drawings, forming a part hereof.

My invention relates to weighing-scales; and it consists in the novel construction, combination, and arrangement of parts, hereinafter described and claimed.

In the drawings, Figure 1 is a vertical sectional view through the scale-beam box and showing the scale-beams and the scale-indicator. Fig. 2 is a horizontal sectional view through the vibration-arrester and taken approximately on the line 2 2 of Fig. 1.

Referring by numerals to the drawings, 1 represents the scale-beam box, and 2 the scale-indicator. The rod 3 connects the mechanism within the box 1 with the mechanism under the scale-platform. The rod 3 connects with the link 4, which is pivotally attached to the stirrup 5 upon the beam 6, and said beam 6 is pivotally connected with the frame by the links 7, attached to the bar 8. The free end of said lever 6 is pivotally connected to the beam 9 by means of the links 10, and the short end of said beam 9 is pivotally connected to the frame by means of the links 11, attached to the bar 12. The free end of the beam 9 is connected to the mechanism of the indicator 2 by means of the rod 13.

Depending from the upper side of the box 1 is the link 14, and depending from said link is the stirrup 15, to which stirrup is pivotally connected the tare-beam 16, and to the long end of said tare-beam is attached the weights 17. To the opposite end of said beam is pivotally attached the hook 18, which hook engages with the eye 19, attached to the collar 20, adjustably positioned upon the rod 13.

The bar 20' is placed in a horizontal position transversely of the box 1. Upon this bar 20' and directly under the tare-beam 16 is a cup 21 in the form of a cylinder. Depending from the beam 16 is the rod 22, upon the lower end of which is the horizontally-positioned perforated disk 23. The disk 23 is normally positioned approximately in the center of the cup 21, and the diameter of said disk is somewhat less than the inside diameter of said cup.

The cup 21 is filled with glycerin, oil, or other substance of a similar consistency, and said disk 23 works in said liquid like a plunger.

The disk is operated by the vibration of the bar 16 through the rod 22, and the gentle yet persistent resistance which the liquid exerts upon the disk 23 is communicated to the bar 16 and greatly decreases its vibration without in any way affecting the ultimate result. The disk operates freely within the cup and does not act as a weight in influencing the position of said beam, but simply acts to kill the vibration of said beam, and the result is that the pointer upon the indicator 2 comes quickly to rest at the proper point.

My weighing-scale is especially useful for heavy and rapid weighing, such as in coal-mines, coal-yards, freight-yards, ship-docks, &c. The weights 17 counterbalance the tare of the load to be weighed, and consequently the net weight of the load will appear upon the indicator.

I claim—

In a scale, the tare-beam 16 mounted in the scale-box as a lever of the first class, the hook 18 attached to the short end of said lever, or tare-beam, the collar 20 adjustably mounted upon the connecting-rod 13 of the scale, the eye 19 projecting from said collar 20 and engaging the hook 18, the cup 21 mounted in position under the long end of said lever or tare-beam, the rod 22 depending downwardly from said lever or tare-beam into said cup, and the disk 23 upon the lower end of said rod 22 operating within said cup, substantially as specified.

In testimony whereof I affix my signature in presence of two witnesses.

FRANK R. MOSER.

Witnesses:
 MAUD GRIFFIN,
 JOHN C. HIGDON.